US006826435B1

(12) United States Patent
Ishida

(10) Patent No.: US 6,826,435 B1

(45) Date of Patent: Nov. 30, 2004

(54) TONE DATA PROCESSING DEVICE AND METHOD

(75) Inventor: Atsushi Ishida, Hamamatsu (JP)

(73) Assignee: Yamaha Corporation, Hammatsu (JP)

( * ) Notice: Subject to any disclaimer, the term of this patent is extended or adjusted under 35 U.S.C. 154(b) by 0 days.

(21) Appl. No.: 09/306,303

(22) Filed: May 6, 1999

(30) Foreign Application Priority Data

May 12, 1998 (JP) .......................................... 10-129200

(51) Int. Cl.[7] ............................ G10H 1/06; G10H 5/02; G06F 17/00

(52) U.S. Cl. ............................. 700/94; 84/622; 84/659

(58) Field of Search ............................. 700/94; 84/622, 84/659, 600, 601, 602, 603; 381/101; 333/28 T

(56) References Cited

U.S. PATENT DOCUMENTS 4,373,416 A * 2/1983 Endo et al. ................... 84/604

5,319,151 A * 6/1994 Shiba et al. .................. 84/603

5,448,009 A * 9/1995 Kudo .......................... 84/602

* cited by examiner

*Primary Examiner*—Forester W. Isen

*Assistant Examiner*—Devona E Faulk

(74) *Attorney, Agent, or Firm*—Morrison & Foerster, LLP

(57) ABSTRACT

Tone generator LSI generates a subframe start signal to be interruptively given to a microprogram, by which the microprogram is activated to issue an interrupt signal to a device driver. In response to the interrupt signal, the device driver prepares control data for use in a next frame. The microprogram receives control data from a RAM at the beginning of each frame and calculates control data for individual samples of the frame on the basis of the received control data as well as control data generated for the last sample of an immediately preceding frame, so as to create a plurality of samples of tone data for each subframe. The thus-created tone data are temporarily written into a buffer and then read out from the buffer in accordance with predetermined clock pulses.

13 Claims, 4 Drawing Sheets

TONE DATA PROCESSING DEVICE AND METHOD

BACKGROUND OF THE INVENTION

The present invention relates generally to devices and methods for processing tone data, and more particularly to a tone data processing device and method which are arranged to collectively create, on the basis of control data, tone data that are to be generated in subframes corresponding to predetermined time periods.

Many personal computers today are equipped with a tone generator LSI to carry out various sound processing, which includes a reproduction process for playing back or reproducing tone data on the basis of waveform data and control data instructing tone generating parameters relating to a color (timbre), pitch and volume of each tone to be generated, an effect process for imparting an effect to the tone data, and a recording process for recording the tone data.

Each of such personal computers is constructed of hardware including a CPU for controlling operations in an entire tone generator device in accordance with an operating system (OS), a tone generator LSI and a memory for storing the control data and waveform data, and software including a microprogram for controlling the tone generator LSI and a device driver for controlling write and read of various data to and from the memory.

For example, the tone generator LSI can perform the above-mentioned processes on a frame-by-frame basis with each frame having a time length of 5.3 ms that is necessary for outputting 256 samples with a 48 kHz output sampling frequency (i.e., a digital-to-analog conversion or DAC rate of 48 kHz). FIG. 5 is a conceptual block diagram illustrating operational relationships between the hardware, microprogram MP and device driver DD employed in the conventional tone generator processing. Here, the term “hardware” refers to an output section of the tone generator LSI, i.e., a section that outputs tone data in accordance with the output sampling frequency, the term “microprogram” MP refers to a microprogram to be executed by a digital signal processor (DSP) that constitutes a principal section of the tone generator LSI, and the term “device driver” DD refers to a software program that, as mentioned above, is run by the CPU of the personal computer for controlling write/read of various data on the main memory.

First, the hardware, constituting the output section of the tone generator LSI, counts the output sampling frequency to issue an interrupt signal, commonly called a frame start signal, to the microprogram MP at start timing of a given frame. The microprogram MP is triggered by the interrupt signal and starts carrying out a predetermined frame routine on the basis of prestored control data CD so as to create 256 samples of tone data SD. This frame routine is completed before a next frame begins. As the microprogram MP is thus triggered, it also interruptively requests the device driver CD to prepare control data CD for use in the next frame. In response to the interruptive request, the device driver DD prepares the control data CD for the next frame, and once the control data DD have been prepared, it sets a flag Active2indicative of completion of the requested control data preparation. In each of the subsequent frames, similar operations are carried out.

The output section of the tone generator LSI includes two output buffers, which, for each of the frames, alternate in storing 256 samples of tone data; that is, while one set of the 256 tone data samples is written into one of the output buffers, another set of the 256 tone data samples is read out from the other output buffer in accordance with the output sampling clock pulses.

It is necessary for each of the output buffers to be able to store the 256 samples of tone data at one time, and to generate such 256 samples to be output, an input buffer must be provided which has a capacity several times greater than the total size of the to-be-output samples. Thus, these buffers would take an innegligibly large proportion of the total chip size of the tone generator LSI. Thus, if the capacity of the buffers can be safely reduced, it would be possible to reduce the chip size and hence the cost of the tone generator LSI, or to allocate another function to the LSI. Therefore, it may be proposed that the respective capacity of the individual buffers be reduced by dividing each of the frames into a plurality of subframes so that the above-mentioned tone generator processing is carried out on the subframe-by-subframe basis rather than the traditional frame-by-frame basis.

FIG. 6 is a conceptual block diagram illustrating an operational sequence when the tone generator processing is carried out for each of four subframes divided from one frame. Once the hardware issues to the microprogram MP a subframe start signal at predetermined subframe start timing, the microprogram MP starts running and simultaneously generates an interrupt signal Int. In response to the interrupt signal Int, the device driver DD starts subframe processing to prepare control data CD for use in a next subframe and also sets the flag Active2before the next subframe begins.

Although the scheme of FIG. 6 can reduce the total size of the buffers to one fourth of the total buffer size required in the traditional frame-by-frame tone generator processing technique, a time interval between the interrupt signals Int would also be made shorter by a factor of four as compared to the traditional tone generator processing, with the result that a total data quantity to be processed increases four times. Further, in the example of FIG. 6, the device driver DD must complete each necessary job within a subframe period of 1.3 ms; however, because the device driver DD operates on the operating system of the personal computer, it is possible that the device driver DD fails to complete the job within the subframe period due to operational relation with other application software. For example, in a situation where a given document is prepared by a word processing program while tones are reproduced via the device driver, such an inconvenience could occur as a data copying operation is effected by the word processing program. Also, in this case, the computer bus would be used exclusively for writing the data within a designated range into the main storage, so that the device driver DD can not use the bus at all and thus can not duly complete the job within the subframe period. Further, because the scheme of FIG. 6 involves an increased frequency of occurrence of the interrupt signal Int, the interrupt signal Int would occur even during a "busy" state of the CPU so that the CPU sometimes can not immediately respond to the interrupt signal. For these reasons, the scheme of FIG. 6 could not carry out, for each of the subframes, the same processing as executed within each frame in the traditional technique.

SUMMARY OF THE INVENTION

It is therefore an object of the present invention to provide a tone data processing device and method which can smoothly carry out tone generator processing with a reduced buffer capacity.

To accomplish the above-mentioned object, the present invention provides an improved tone data processing device which comprises: a start signal generating section that generates a start signal every predetermined time when a subframe should be caused to begin; an interrupt signal generating section that generates a single interrupt signal per frame made up of a plurality of subframes; a control data preparing section that prepares control data for use in a next frame, in response to the interrupt signal generated by the interrupt signal generating section; and a tone data creating section that is activated in each of the subframes in response to the start signal generated by the start signal generating section, to collectively create tone data to be generated in the subframe on the basis of the control data prepared in an immediately preceding frame by the control data preparing section.

In the tone data processing device of the present invention, the tone data creating section carries out the operation of collectively creating tone data for each subframe having a capacity or time length several times smaller than that of a single frame, so that the necessary capacity of input and output buffers used can be greatly reduced. On the other hand, only one interrupt signal is generated per frame made up of a plurality of the subframes and thus it is only necessary that the control data preparing section, in response to the only one interrupt signal per frame, carry out the operation of preparing control data for use in the next frame, with the result that the load on the control data preparing section can be reduced significantly. Namely, it is possible to lower the frequency of interrupt occurrence to a CPU functioning as the control data preparing section, which can significantly lessen the load on the CPU.

Tone data processing system in accordance with a preferred implementation of the present invention includes a computer and a tone generator device for generating a tone signal under control of the computer, and the tone generator device comprises: a section that generates a start signal every predetermined time when a subframe should be caused to begin; a section that generates a single interrupt signal per frame made up of a plurality of subframes; and a tone data creating section that, in response to the start signal for each of the subframes, collectively creates tone data to be generated in the subframe on the basis of control data prepared by the computer. Here, the computer prepares the control data for use in a next frame, in response to the interrupt signal generated per frame by the tone generator device.

Preferably, the computer includes a memory storing waveform data, and the tone data creating section of the tone generator device carries out arithmetic operations to calculate a plurality of samples of the waveform data necessary for creating the tone data to be generated in the subframe, causes the calculated samples of the waveform data to be transferred from the memory, and then creates a plurality of samples of the tone data on the basis of the samples of the waveform data transferred from the memory.

The tone generator device may further include an output buffer and temporarily stores, into the output buffer, the plurality of samples of the tone data created by the tone data creating section. The plurality of samples of the tone data temporarily stored in the output buffer may be sequentially read out within a time period of the subframe in accordance with predetermined clock pulses in such a manner that a tone reproduction process is carried out at a predetermined sampling frequency.

The present invention may be implemented not only as the device invention but also as a method invention. The present invention may also be practiced as a program for execution by a computer, processor or the like, and also as a recording medium containing such a program.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
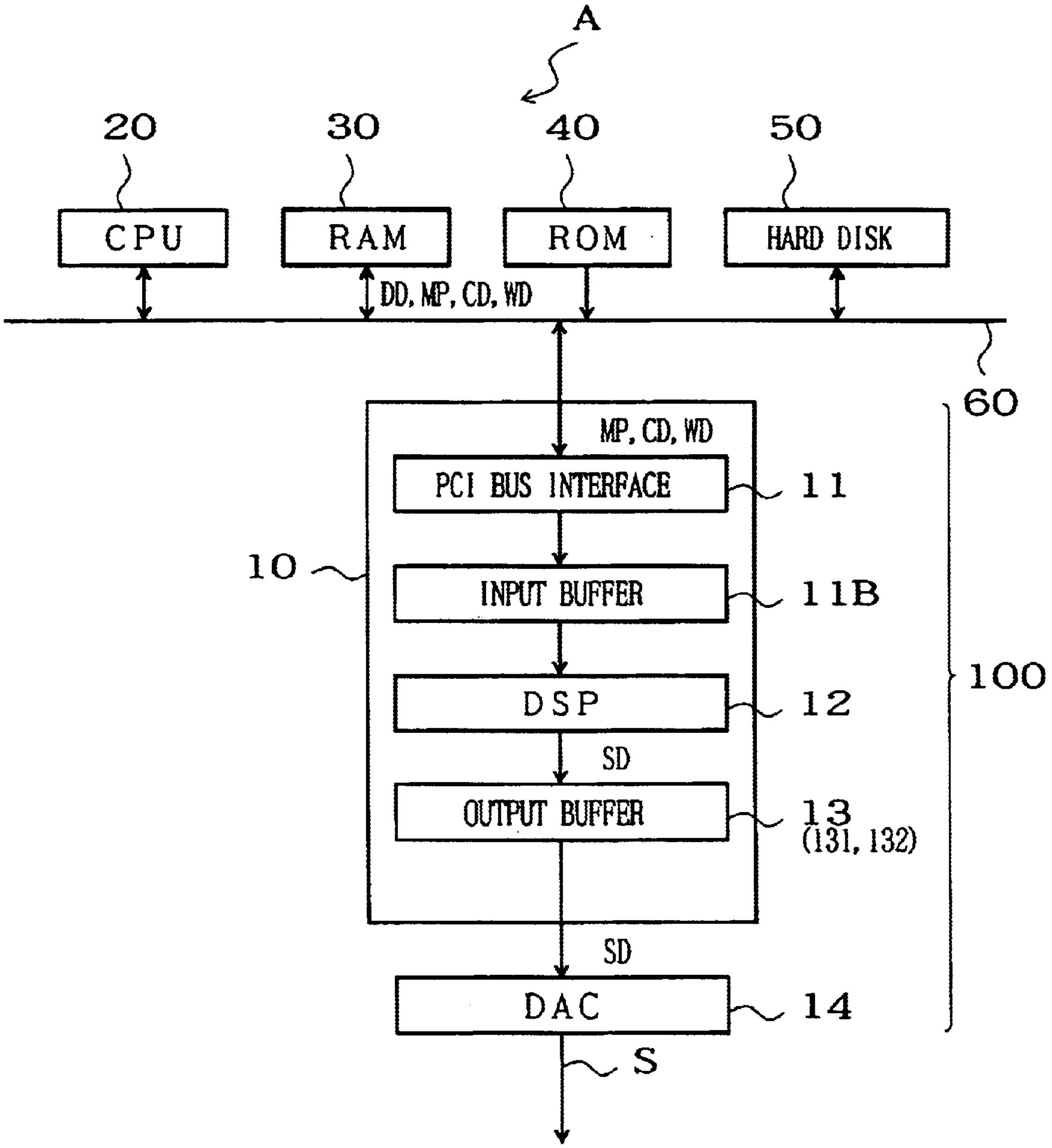
FIG. 1 is a block diagram of a computer system to which is applied a tone data processing device in accordance with an embodiment of the present invention.

FIG. 1 is a block diagram of a computer system in accordance with a preferred embodiment of the present invention.

In FIG. 1, a CPU (Central Processing Unit) 20, which is connected via a bus 60 with various components of the computer system A, controls operations in the entire system A. RAM (Random Access Memory) 30, which is a read/write memory functioning as a main memory of the computer system A, provides working areas for use by the CPU 20. ROM 40 is a read-only memory having prestored therein various programs including a boot program. Hard disk 50, which is a secondary storage of the computer system A, has prestored therein various programs including as a device driver DD and microprogram MP and various data such as control data CD and waveform data WD, so that a desired program and/or data are loaded from the hard disk 50 to the RAM 30 whenever necessary. Here, the control data CD include color information (indicating addresses where a set of the waveform data WD corresponding to a designated timbre or tone color is stored), pitch information and volume level information. The waveform data WD are data obtained by sampling tones that were actually produced with musical instruments corresponding to various desired tone colors such as those of guitar and piano.

In the illustrated example of FIG. 1, the device driver DD, microprogram MP and waveform data WD are transferred via the bus 60 to the RAM 30 and the control data CD designated by a higher-order software application program are also transferred to the RAM 30 as necessary, at startup of an operating system (OS). Assume here that the bus 60 is a PCI (Peripheral Component Interconnect) bus capable of operating in a burst transmission mode, although any other suitable bus may be used in the computer system A.

The computer system A also includes a tone generator board 100 insertable into an extension slot (not shown), and on the tone generator board 100, there are provided a tone generator LSI (Large Scale Integrated circuit) 10 for creating tone data SD and a digital-to-analog converter (DAC) 14 for converting each of the tone data SD, created by the tone generator LSI 10, into an analog tone signal S.

The tone generator LSI 10 includes a PCI bus interface 11, an input buffer 11B, a DSP (Digital Signal Processor) 12 and output buffers 13. The PCI bus interface 11 is equipped with a bus master function so that the tone generator LSI 10 can read out the control data CD and waveform data WD from the RAM 30 directly, i.e., without intervention of the CPU 20.

The DSP 12 includes a memory for storing the microprogram MP, a program counter for generating addresses for reading out the microprogram MP from the memory and an arithmetic operating section for performing arithmetic operations, and it executes operations for creating tone data SD as dictated by the microprogram MP. More specifically, the DSP 12 specifies a particular type of the waveform data SD corresponding to the color information designated by the control data CD and determines, on the basis of the pitch information designated by the control data CD, which data are to be read out from among the waveform data WD. Also, the DSP 12 specifies a gain for each sample on the basis of the volume level information designated by the control data-CD. Thus, the DSP 12 calculates various parameters necessary for processing a subframe in question (subframe processing), after which it burst-transmits the necessary waveform data WD via the PCI bus interface 11 to the input buffer 11B for temporary storage therein. Then, in accordance with the parameters calculated on the basis of the pitch information, the DSP 12 performs an interpolation process on the waveform data WD supplied from the input buffer 11B so as to adjust a reproducing pitch. In addition, the DSP 12 adjusts the gain in accordance with the volume level information to create the tone data SD. The embodiment is arranged such that all of these operations can be completed within a predetermined subframe period as will be detailed later, and the program counter stops counting upon completion of the operations so that the microprogram MP is brought into a wait state.

The output buffer 13 consists of first and second buffers 131 and 132, each of which has a capacity for storing only 64 samples at one time. The first and second buffers 131 and 132 alternately store 256 samples of the tone data SD; that is, while one set of the 256 tone data samples is written into one of the first and second buffers 131 or 132, another set of the 256 tone data samples already written is read out from the other buffer 132 or 131.

Now, a detailed description will be given about behavior of the computer system A in accordance with the preferred embodiment of the present invention in relation to a case where each frame is divided into four subframes, although the number of the subframes constituting a single frame may be other than four.

Figure 2:
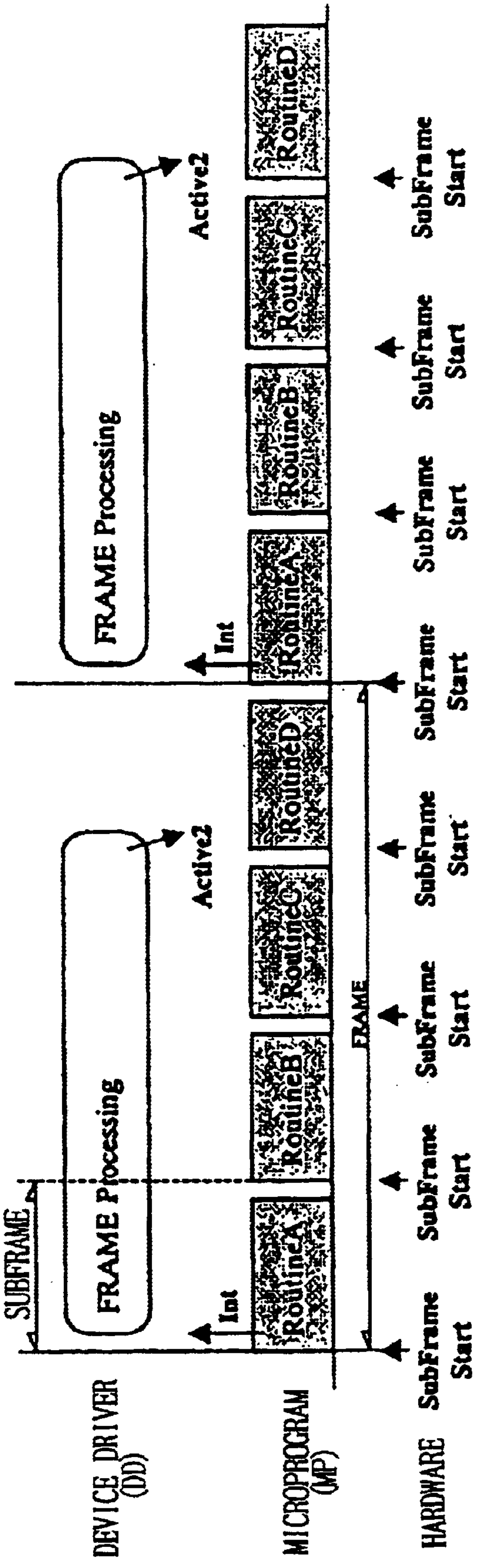
FIG. 2 is a conceptual block diagram showing exemplary operation of the computer system when performing tone generator processing.

FIG. 2 is a conceptual block diagram showing exemplary operation of the computer system A when performing tone generator processing. Output section (not shown) of the tone generator LSI 10, corresponding to "HARDWARE" of FIG. 2, generates a subframe start signal at predetermined start timing of each subframe on the basis of a timer output, which is interruptively given to the microprogram MP. In response to the subframe start signal from the "HARDWARE", the microprogram MP is activated and issues an interrupt signal Int to the device driver DD. Note that after reception of the first subframe start signal, the microprogram MP issues interrupt signals Int at a rate of one interrupt signal per four subframe start timings; this means that the interrupt signal Int is generated only at the beginning of each frame.

Figure 5:
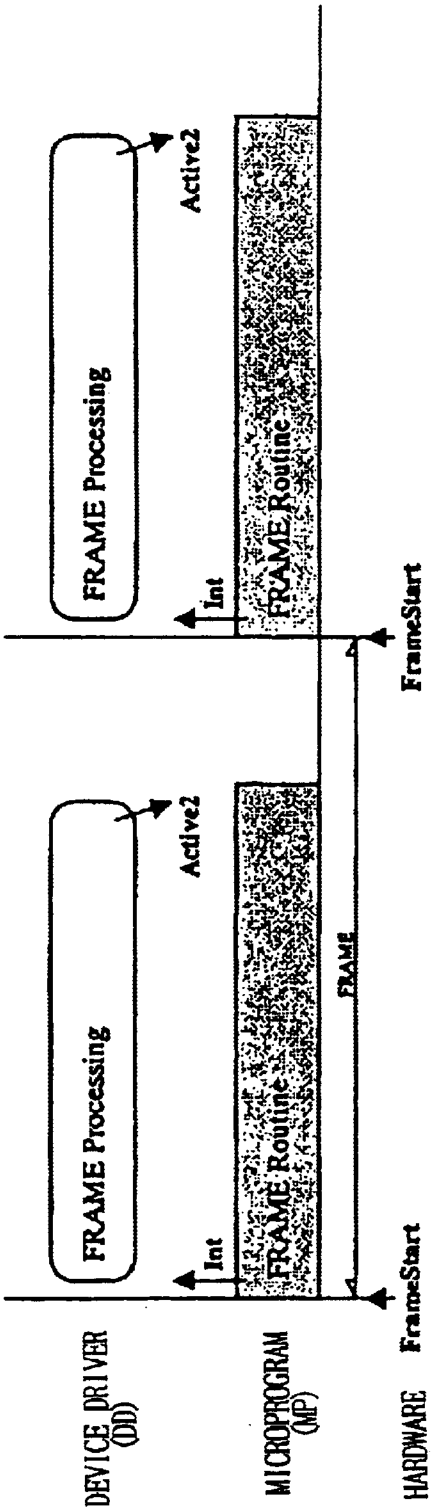
(PRIOR ART) FIG. 5
FIG. 5 is a conceptual block diagram illustrating operational relationships between hardware, microprogram and device driver employed in conventional tone generator processing.
Figure 6:
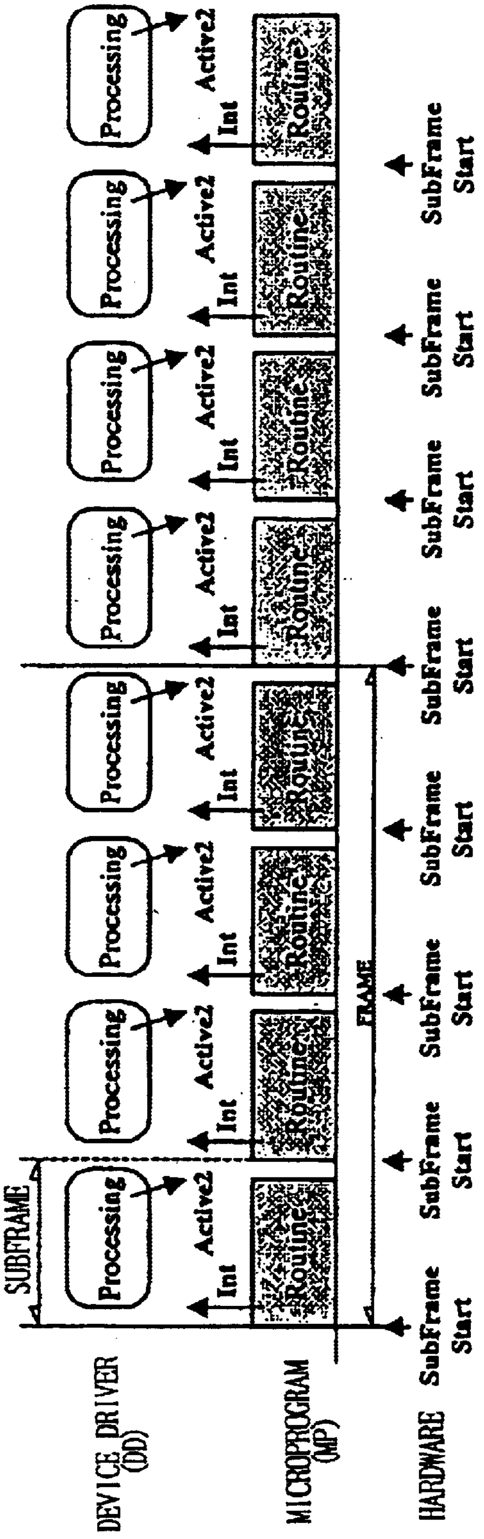
(PRIOR ART) FIG. 6
FIG. 6 is a conceptual block diagram illustrating an operational sequence when the tone generator processing is carried out for each of four subframes divided from one frame.

The device driver DD, having received the interrupt signal Int from the microprogram MP, prepares the control data CD for use in the next frame and writes them into a predetermined storage area of the RAM 30, and once the necessary control data DD have been prepared completely, it sets a flag Active2indicative of completion of the control data preparation. In this way, the preparation of the control data CD is made only once per frame. Thus, the load on the device driver DD can remain the same as in the prior art example of FIG. 5, so that the device driver DD can readily complete the necessary job within a predetermined time period. As a consequence, it is possible to almost completely avoid the inconvenience that the device driver DD fails to complete the job within the subframe period due to operational relation with other application software, and smooth execution of the tone generator processing is achieved in the embodiment.

Then, once the microprogram MP detects, through reference to the flag Active2, that the preparation of the control data CD has been completed, it receives the control data CD from the RAM 30 at the beginning of the next frame, on the basis of which it carries out the tone generator processing ("ROUTINE A") to create 64 samples of tone data SD. Further, the microprogram MP generates control data CD for use in the next subframe and writes the thus-generated control data into the RAM 30 (this operation will be hereinafter referred to as a "write-back operation"). The control data CD include pitch information and volume level information as noted earlier, and the pitch information is given by arithmetic progression interpolation in the illustrated example while the volume level information is given by linear interpolation. The reason why the pitch information is given by arithmetic progression interpolation is that linear pitch variations tend to sound unnatural to the human auditory sense although linear volume variations can be felt as natural and the arithmetic progression interpolation can be suitable for allowing the pitch variations to sound natural to the human ear.

Figure 3:
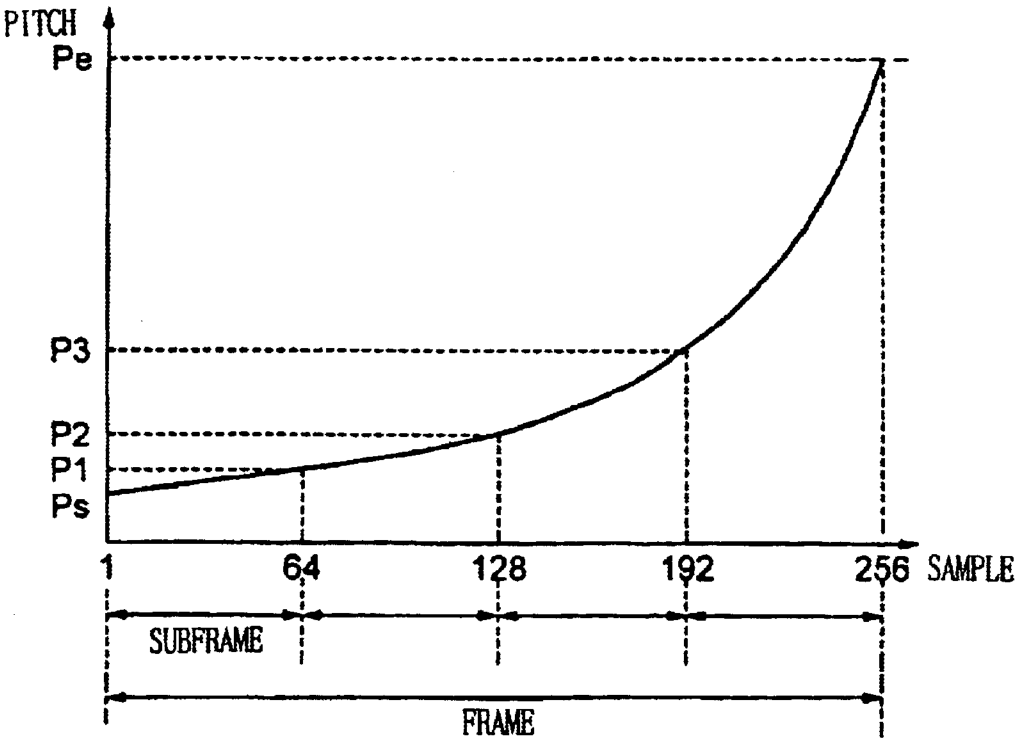
FIG. 3 is a conceptual diagram illustrating a manner in which pitch information is calculated in the embodiment.

FIG. 3 is a conceptual diagram illustrating an exemplary manner in which the pitch information is calculated in the embodiment. By the time when a given frame begins, a pitch Pe to be used at the end (i.e., 256th sample) of the frame has been supplied by the device driver DD, and a pitch Ps to be used at the beginning of the frame has been supplied by the write-back operation in an immediately preceding subframe. In this case, pitches of individual samples in the first or leading subframe of that frame are calculated on the basis of the pitches Pe and Ps, and a pitch at the end (i.e., 64th sample) of the first subframe is written back. Similarly, in the second subframe, pitches of individual samples are calculated on the basis of the pitches P1 and Pe, and a pitch P2 at the end (i.e., 128th sample) of the subframe is written back. Further, in the third subframe, pitches of individual samples are calculated on the basis of the pitches P2 and Pe, and a pitch P3 at the end (i.e., 192th sample) of the subframe is written back. Further, in the fourth subframe, pitches of individual samples are calculated on the basis of the pitches P3 and Pe.

Figure 4:
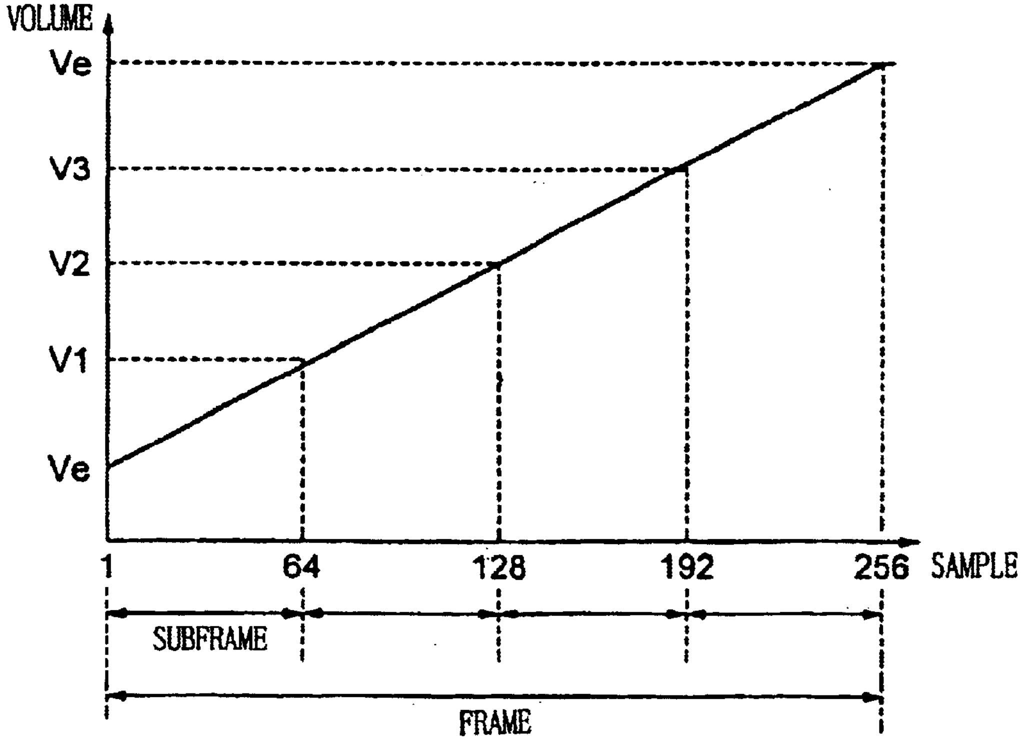
FIG. 4 is a conceptual diagram illustrating a manner in which volume level information is calculated in the embodiment.

FIG. 4 is a conceptual diagram illustrating an exemplary manner in which the volume level information is calculated in the embodiment. By the time when a given frame begins, a volume level Ve to be used at the end (i.e., 256th sample) of the frame has been supplied by the device driver DD, and a volume level Vs to be used at the beginning of the frame has been supplied by the write-back operation in an immediately preceding subframe, in a similar manner to the pitch information calculation. In this case, volume levels of individual samples in the first or leading subframe of that frame are calculated on the basis of the volume levels Ve and Vs, and a volume level V1 at the end (i.e., 64th sample) of the first subframe is written back. Volume levels in the second and third subframes of that frame are calculated in a similar manner to the first subframe.

Thus, in each of the subframe processing (ROUTINE A–ROUTINE D), the microprogram MP creates tone data SD for the individual samples using the control data CD having been written back by itself in the immediately preceding subframe as well as the control data CD having been prepared by the device driver DD, and the microprogram MP writes the thus-created tone data SD into the first and second buffers in an alternate fashion as previously noted. While the microprogram MP writes one set of the 256 tone data samples into one of the buffers 131 or 132, it reads another set of the 256 tone data samples from the other buffer 132 or 131. The tone data SD read out from the first or second buffer are then each converted into an analog tone signal S via the DAC 14. Here, because it is only necessary for each of the first and second buffers 131 and 132 to store the tone data SD of a single subframe, the necessary capacity of each of the first and second buffers 131 and 132 can be reduced to one fourth of the capacity required of the prior art counterpart. The necessary capacity of the input buffer 11B, for storing the waveform data WD burst-transmitted from the RAM 30 to create the tone data SD for each of the subframes, can also be reduced to one fourth of the capacity required of the prior art counterpart.

As described above, the microprogram MP in the preferred embodiment of the present invention is arranged to write back control data CD arithmetically generated for each of the subframes, generate control data CD corresponding to the individual samples on the basis of the control data CD having been written back in an immediately preceding subframe (corresponding to the beginning of the subframe in question) and the control data CD having been generated by the device driver DD (corresponding to the end of the subframe in question), and then create tone data SD for that subframe using the generated control data CD. This arrangement can significantly lessen the load on the device driver DD, because it requires only one interrupt signal Int to the device driver DD per frame. Further, the described arrangement can almost completely avoid the inconveniences that the processing by the device driver DD is disturbed by another application program of a higher priority and the preparation of the necessary control data DD can not be completed within a predetermined time period. Moreover, because only one interrupt signal Int has to occur per frame, it is possible to almost completely avoid the undesirable situation where desired processing has to be waited due to a "busy" state of the CPU.

Therefore, the described embodiment achieves smooth tone generator processing with the capacity of the output and input buffers 13 and 11B reduced to one fourth of that required in the prior art. Thus, the chip size of the tone generator LSI can be reduced to such a degree as to achieve a substantial cost reduction. In addition, because the same device driver DD as in the conventional tone generator processing (FIG. 5) can be used in the embodiment, any conventional computers can be employed, with good compatibility, by only replacing the microprogram MP and tone generator board 100 as necessary.

Whereas the present invention has been described above only in relation to the preferred embodiment, it is not so limited and various modifications may be made as set forth below in items 1) through 5).

1) In the above-described embodiment, the microprogram MP is arranged to receive control data CD (corresponding to the last sample of a given frame) already prepared on the frame-by-frame basis by the device driver DD and generate control data for individual samples of each subframe on the basis of the thus-received control data CD and control data for the last sample having been calculated in an immediately preceding subframe. With the described arrangement, however, it is necessary that the microprogram MP writes the control data CD for the last sample into the RAM 30 every subframe and then read out the thus-written control data CD when initiating the subframe processing, which would substantially increase the load on the microprogram MP. Thus, to lessen the load on the microprogram MP, a modification may be made such that the control data CD for the last sample in each of the subframes is calculated by the device driver DD and stored into the RAM 30. With such a modification, it is possible to eliminate the need for the write-back operation by the microprogram MP, and the microprogram MP can generate the control data CD for the individual samples within the predetermined subframe period by reading out the control data corresponding to the beginning and end of the subframe.

Alternatively, the device driver DD may generate the control data CD and store the thus-generated control data CD into the RAM 30 on the frame-by-frame basis so that, for each of the subframes, the microprogram MP can transfer from the RAM 30 the control data CD corresponding to the subframe.

Further, the bus 60 of FIG. 1 may be a high-speed bus, such as an AGP (Accelerated Graphics Port), rather than the PCI bus.

2) In the above-described embodiment, the microprogram MP is stored in the RAM 30, from which they are downloaded into an internal RAM of the DSP 12. Alternatively, a ROM having the microprogram MP prestored therein may be provided within the DSP 12.

3) The preferred embodiment has been described above mainly in connection with the waveform reproduction process. In a modification, the waveform reproduction process, effect process and recording process may be carried out in each of the subframes on a time divisional basis. Further, whereas the preferred embodiment has been described as generating a single tone at a time, the present invention is not so limited and may be applied to a polyphonic scheme where a plurality of tones are generated simultaneously at a time. In such a polyphonic case, time slots for performing the waveform reproduction process may be divided into slots corresponding to a plurality of tone generating channels; however, the burst transmission mode of the PCI bus can be utilized by causing the operations for reading the control data CD and waveform data WD and the write-back operation of the control data CD to be executed collectively for the plurality of tones.

4) In the above-described embodiment, the device driver DD can prepare the control data CD with sufficient leeway because only one interrupt signal Int is given to the device driver DD per frame. However, in case the preparation of the control data CD is not completed prior to the beginning of a next frame, the microprogram may detect it from the flag Active2and execute the subframe processing as if there were no variation in the control data CD. Then, once the flag Active2turns to an active state, the microprogram MP may proceed with the subframe processing using the control data CD having been completely prepared.

5) Furthermore, the pitch information and volume information specified by the control data CD may be given as variations between the samples. In this case, parameters for the individual samples can be determined by first giving respective predetermined values at the beginning of tone generation and then sequentially accumulating variation amounts to the initial values. Thus, the parameters accumulated at the last sample of each of the subframes are written back at the end of that subframe.

Note that the subframes may have either a same time length or different time lengths.

In summary, the present invention is characterized in that control data are prepared on the frame-by-frame basis and tone data are created for each subframe on the basis of the control data. This inventive arrangement can reduce the necessary buffer storage capacity while reducing the load involved in the preparation of the control data.

What is claimed is:

1. A tone data processing device comprising:

a start signal generating section that generates a start signal every predetermined time when a subframe should be caused to begin;

an interrupt signal generating section that generates a single interrupt signal per frame made up of a plurality of subframes;

a control data preparing section that prepares control data for use in a next frame, in response to the interrupt signal generated by said interrupt signal generating section; and a tone data creating section that is activated in each of the subframes in response to the start signal generated by said start signal generating section, to collectively create tone data to be generated in said subframe on the basis of the control data prepared in an immediately preceding frame by said control data preparing section.

2. A tone data processing device as recited in claim 1 which further comprises a buffer storage section that temporarily stores the tone data for one of the subframes collectively created by said tone data creating section.

3. A tone data processing device as recited in claim 1 wherein said control data preparing section prepares the control data for use in individual ones of the subframes constituting the next frame.

4. A tone data processing device as recited in claim 1 wherein said tone data creating section creates the control data for use in individual ones of the subframes on the basis of the control data prepared by said control data preparing section.

5. A tone data processing device as recited in claim 1 wherein said start signal generating section, said interrupt signal generating section and said tone data creating section are provided in a dedicated hardware tone generator device, and said control data preparing section is included in a general-purpose computer system.

6. A tone data processing device as recited in claim 5 wherein in collectively creating the tone data to be generated in the subframe on the basis of the control data, said tone data creating section utilizes waveform data prestored in a main storage that is provided within the general-purpose computer system.

7. A tone data processing device as recited in claim 1 wherein said control data preparing section prepares a plurality of the control data for use in the next frame, and said tone data creating section collectively creates a plurality of the tone data for use in the subframe on the basis of said plurality of the control data.

8. A tone data processing device comprising:

start signal generation means for generating a start signal every predetermined time when a subframe should be caused to begin;

interrupt signal generation means for generating a single interrupt signal per frame made up of a plurality of subframes;

control data preparation means for preparing control data for use in a next frame, in response to the interrupt signal; and means activatable in each of the subframes in response to the start signal generated by said start signal generation means, for collectively creating tone data to be generated in said subframe on the basis of the control data prepared in an immediately preceding frame by said control data preparation means.

9. A tone data processing method comprising the steps of:

generating a start signal every predetermined time when a subframe should be caused to begin;

generating a single interrupt signal per frame made up of a plurality of subframes;

preparing control data for use in a next frame, in response to the interrupt signal; and in response to the start signal generated in each of the subframes by said step of generating a start signal generation, collectively creating tone data to be generated in said subframe on the basis of the control data prepared in an immediately preceding frame by said step of preparing control data.

10. A machine-readable recording medium containing instructions of a program to be executed by a processor for carrying out tone data processing, said program comprising the steps of:

generating a start signal every predetermined time when a subframe should be caused to begin;

generating a single interrupt signal per frame made up of a plurality of subframes;

preparing control data for use in a next frame, in response to the interrupt signal; and in response to the start signal generated in each of the subframes by said step of generating a start signal generation, collectively creating tone data to be generated in said subframe on the basis of the control data prepared in an immediately preceding frame by said step of preparing control data.

11. A tone data processing system including a computer and a tone generator device for generating a tone signal under control of the computer, said tone generator device comprising:

a section that generates a start signal every predetermined time when a subframe should be caused to begin;

a section that generates a single interrupt signal per frame made up of a plurality of subframes; and a tone data creating section that, in response to the start signal for each of the subframes, collectively creates tone data to be generated in the subframe on the basis of control data prepared by said computer, wherein said computer prepares-the control data for use in a next frame, in response to the interrupt signal generated per frame by said tone generator device.

12. A tone data processing system as recited in claim 11 wherein said computer includes a memory storing waveform data, and wherein said tone data creating section of said tone generator device carries out arithmetic operations to calculate a plurality of samples of the waveform data necessary for creating the tone data to be generated in said subframe, causes the calculated samples of the waveform data to be transferred from said memory, and creates a plurality of samples of the tone data on the basis of the samples of the waveform data transferred from said memory.

13. A tone data processing system as recited in claim 12 wherein said tone generator device further includes an output buffer and temporarily stores into said output buffer the plurality of samples of the tone data created by said tone data creating section, and wherein the plurality of samples of the tone data temporarily stored in said output buffer are sequentially read out within a time period of said subframe in accordance with predetermined clock pulses in such a manner that a tone reproduction is carried out at a predetermined sampling frequency.

* * * * *